UNITED STATES PATENT OFFICE.

MARI E. WOLVEKAMP, OF CHICAGO, ILLINOIS, ASSIGNOR TO THE ABBOTT LABORATORIES, OF CHICAGO, ILLINOIS, A CORPORATION OF ILLINOIS.

PHENYLCINCHONIC-ACID SALT.

1,361,128. Specification of Letters Patent. Patented Dec. 7, 1920.

No Drawing. Application filed September 15, 1917. Serial No. 191,511.

*To all whom it may concern:*

Be it known that I, MARI E. WOLVEKAMP, a subject of the Queen of Holland, and a resident of Chicago, in the county of Cook and State of Illinois, have invented certain new and useful Improvements in Phenylcinchonic-Acid Salt, of which the following is a specification.

My invention relates to improvements in drugs, and has for its principal object the providing of a new medicinal substance or preparation which may be used in the place of phenylcinchonic acid, and for such other additional purposes as will readily occur to those skilled in the art in view of the improved properties possessed by my new drug.

Phenylcinchonic acid is a pharmaceutical material which is used extensively for medicinal purposes, particularly in the elimination of uric acid from the blood, where it has been found especially valuable. Unfortunately, however, phenylcinchonic acid is very sparingly soluble in water at ordinary temperatures, such lack of solubility impairing its usefulness in many instances. An object of my invention is to provide a salt which will have medicinal properties equal or superior to those possessed by phenylcinchonic acid, while at the same time being freely soluble so as to render such desirable properties readily available. A further object of my invention is to provide a soluble salt of phenylcinchonic acid.

As illustrating one method of carrying out my invention, I take one grammol. (249 gr.) of phenylcinchonic acid and add same to approximately 800 gr., or less, of water in which ½ grammol. (that is to say, 20 gr.) of sodium hydroxid has been dissolved. The resulting suspension is then stirred and rubbed vigorously, whereupon it commences to thicken, the rubbing of the thickened mass being continued until it reaches a buttery consistency.

The buttery mass is then filtered, preferably in a filter press, the filtrate containing a comparatively small amount of phenylcinchonic acid, which can easily be regained with a little hydrochloric acid. The acid sodium salt remaining in the filter may, if desired, be purified by washing with a little water, after which the salt is dried at a temperature which should preferably be maintained below 100° C., at which temperature it has a tendency to decompose into phenylcinchonic acid and its sodium salt.

The acid sodium salt, acid sodium phenylcinchonate thus produced may be represented as follows:

Sodium phenylcinchonate plus acid phenylcinchonate

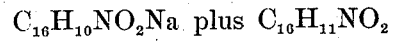

$C_{16}H_{10}NO_2Na$ plus $C_{16}H_{11}NO_2$

It exists as citron yellow crystals which are comparatively freely soluble in water. It has all of the medicinal properties of phenylcinchonic acid, in addition to which it has vastly greater solubility, which makes it particularly valuable for medicinal purposes.

I claim—

Acid sodium phenylcinchonate having substantially the formula

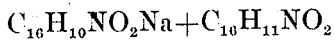

$C_{16}H_{10}NO_2Na + C_{16}H_{11}NO_2$ crystallizable in the form of citron yellow crystals freely soluble in water.

MARI E. WOLVEKAMP.